Patented June 3, 1930

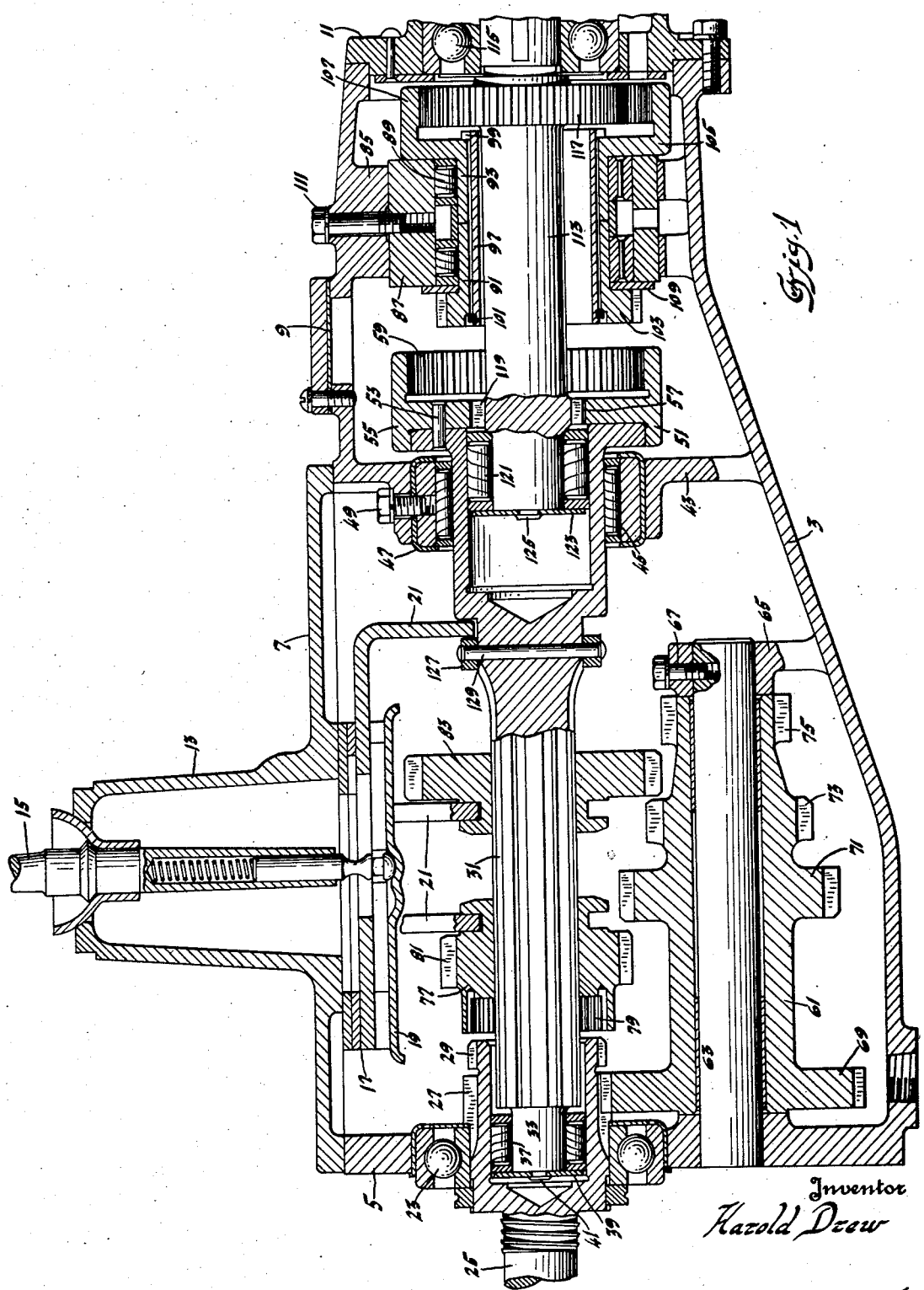

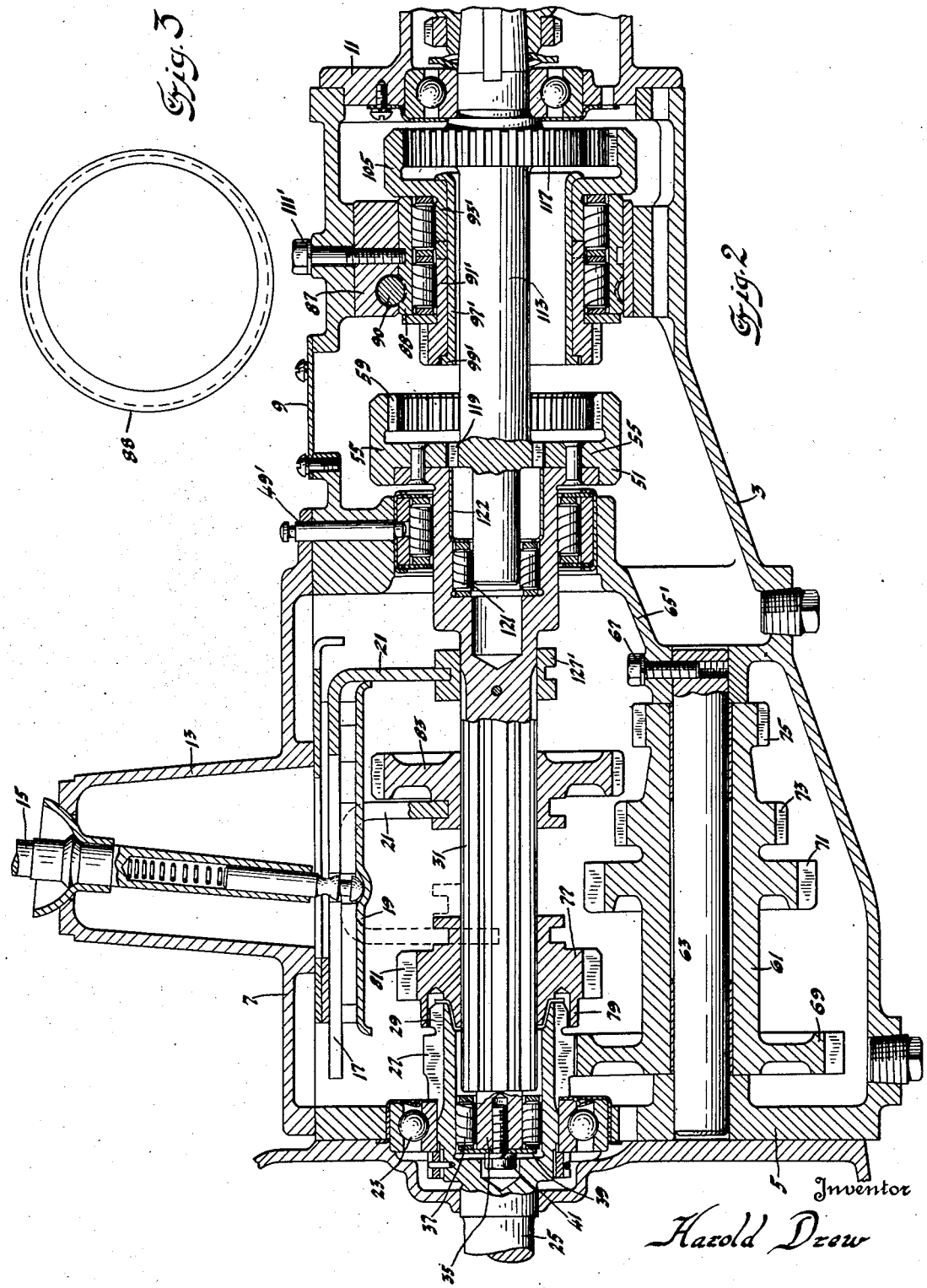

1,761,907

UNITED STATES PATENT OFFICE

HAROLD DREW, OF LANSING, MICHIGAN, ASSIGNOR TO GENERAL MOTORS CORPORATION, OF DETROIT, MICHIGAN, A CORPORATION OF DELAWARE

OVERGEAR TRANSMISSION

Application filed July 13, 1927. Serial No. 205,513.

This invention relates to transmission gearing. It has been designed as an improvement in change speed gearing for motor vehicles.

The gearing herein described aims to provide a flexible plural speed transmission between the driving and driven shaft by a construction at once simple, easy of assembly, easy of operation, and having adequate support for its movable parts. Differing from earlier types of transmission gearing, the present application aims to provide a construction permitting a more convenient shifting arrangement. It also goes further in the matter of simplicity and it aims to reduce the momentum of the driven rotating parts when making the shift from third speed to overgear.

Other objects and advantages will be apparent from a reading of the following description and an examination of the accompanying drawing.

In the drawing:

Figure 1 represents a longitudinal vertical section through a transmission housing embodying my invention.

Figure 2 shows a similar view of a modified and probably a preferred form. Figure 3 is a detail in elevation.

Referring first to Figure 1, numeral 3 represents a transmission housing shown as having an integral front wall 5, a removable cover 7, an inspection plate 9 and a removable rear wall 11. The cover 7 has an upward extension 13 carrying by a universal joint the operating lever 15. The operating lever is associated with shifter plates 17 slidably mounted on a supporting plate 19. These shifter plates have associated with them suitable forks 21 for making the several gear shifts. The claims of this case are not directed to the specific shifter mechanism and this structure is not being given in detailed description.

Entering the front wall 5 of the housing through bearings 23 is a driving shaft 25 which is being rotated by the conventional clutch. Just within the bearings 23 shaft 25 is formed with gear teeth 27, and at the end of the shaft are external clutch teeth 29. The spline shaft 31 has its end 33 reduced and surrounded by bearings 37. These bearings are held in position on the reduced end of the shaft by an annular plate 39 and fastening means 41. The housing 3 is formed with an intermediate partition 43 having an opening concentric with the axis of shaft 31. In this opening there is positioned a bearing member 45 held by an annular cup 47 and a fastening cap screw 49. The enlarged rear end of shaft 31 is rotatably mounted in the bearing member 45 and on the rear side of the bearing is formed with an annular flange 51. Secured by rivets or the like 53 to the flange 51 is a gear member 55. Gear member 55 has a forward shoulder portion surrounding the flange 51. It has internal clutch teeth at 57 and at the periphery of the gear member 55 there is formed an internal gear 59.

The spline shaft 31 is to be driven from the driving shaft 25 at the same speed as the driving shaft, at a plurality of lower speeds, or in a reverse direction. To that end there is mounted a countershaft 61 rotatably about a fixed shaft 63 extending from the front wall of the housing to a wall 65 adjacent the middle of the housing. The shaft 63 is held in position by suitable fastening means 67. The countershaft is provided with a driven gear 69 and with gears 71, 73 and 75. On the spline shaft 31 is a sliding member 77 which has clutch teeth 79 and gear teeth 81. On the spline shaft there is also slidably and non-rotatably mounted a second gear 83. When gear 77 is moved to the left from its neutral position shown in the figure its clutch teeth 79 engage with clutch 29 on the driving shaft and the spline shaft and driving shaft rotate in union, the countershaft under these circumstances rotating idly and not being under load. When the gear member 77 is moved to the right its teeth 81 engage teeth 71 on the countershaft. The two gear trains, including gears 27 and 69, and 71 and 81, thus drive the spline shaft at a speed less than that of the driving shaft. When gear 83 is moved to the left from its illustrated position it engages gear 73 on the countershaft whereupon the spline shaft is driven at low speed. For driving in reverse gear 83 is moved to the right from its illustrated position and enters the plane of gear 75. A reverse idler, not shown and in constant engagement with gear 75, thereupon reverses the drive between the countershaft and the spline shaft in a way well understood.

Between the wall 43 and the end wall 11 is another wall 85 having an axial opening within which is positioned a ring 87 having its opening eccentric with reference to the axis of shaft 31. Mounted within this ring 87 by bearings 89 is an overgear idler. This overgear idler is composed of two parts 91 and 93 concentric with each other. These two parts are keyed to a supporting ring 97, engaging a shoulder 99 at one end and held by a fastening means 101 at the other end. The member 91 extends to the front of the bearing member and has an external pinion 103 formed thereon. The member 93 which extends to the rear is formed with a radial flange 105 terminating in an internal gear 107. A spacing and retaining ring 109 is placed between gear 103 and the front end of the bearing 89. A screw member 111 passes through the housing and into the member 87 to retain the latter from longitudinal movement and from rotation.

A shaft 113 in alignment with shaft 31 extends through the rear wall 11 where it is provided with suitable bearings 115. This shaft carries a spur pinion 117 which is at all times in driven engagement with internal gear 107 of the overgear idler. Adjacent its forward end shaft 113 is provided with clutch teeth 119. At its forward end the shaft 113 is somewhat reduced and bearings 121 are positioned around this reduced end and held by a ring member 123 secured to the shaft by fastening means 125. It may be assumed that the spline shaft is clutched to the driving shaft by the engagement of clutch teeth 79 with teeth 29 and also that the driven shaft 113 is in the position illustrated wherein clutch teeth 57 and 119 are in engagement. Under these circumstances it will be obvious that the driven shaft is rotating at the same rate as the spline shaft and its driving shaft. The gear shifting provision makes possible a rearward movement of the spline shaft. Its shifting fork 21 is shown to be engaged between a shoulder on shaft 31 and a ring member 127 secured to the shaft by fastening means 129. When, therefore, the spline shaft 31 is moved rearwardly its clutch teeth separate from the clutch teeth 119 of shaft 113 and its gear member 59 is brought into engagement with the spur pinion 103 constituting a part of the overgear idler. When the parts are thus engaged it will be seen that the driven shaft 113 is rotated through the engagement of two internal gear trains, including gears 59 and 103 and gear 107 and 117. Each of these two gear trains gives a step-up ratio, the combined effect giving a considerable speed to the driven shaft 113 above that of the driving shaft.

In a former construction the overgear drive was obtained by a forward movement of a sliding sleeve on the driven shaft. This forward movement was obtained by a movement in a rearward direction of the knob end of the gear shaft lever, to a further extent than the rearward movement required for direct driving. In the present case it will be noticed that the overgear drive is accomplished by a rearward movement of the slidable member within the transmission housing. This rearward movement is associated with a forward movement of the gear shift lever. This difference I consider to be quite advantageous in that a rearward movement of the lever beyond the position for normal high speed might in many cases bring the lever too close to the vehicle seat. In the present case where the movement for overgear is one in a forward direction at the knob end of the lever this difficulty is overcome. The construction also permits a shorter fork for the overgear drive. It also eliminates the necessity for the sleeve which was slidably mounted on the driven shaft, the function of the sleeve being accomplished by slidable movement of the spline shaft itself. In shifting from third or direct speed in the present case the overgear idler is in driving relation with the rear end of the vehicle and tends to come to rest, thereby facilitating the necessary gear engagement for overgear. This I believe to be better than the arrangement in the former case where the overgear idler remained coupled to the equivalent of the internal gear 59 of this application.

In Figure 2 the casing 3 has a front wall 5, a cover 7, inspection plate 9, and a removable rear cover 11 as before. The gear shifting mechanism remains as in the form already described, except that in place of the ring 127 I substitute a collar member 127' secured to the spline shaft.

The spline shaft 31 in this second form of the invention carried with it in its movements the roller bearings at its two ends. At the front end the reduced end 35 carries the bearings 37 in the manner described in connection with the first form. Within the open rear end of shaft 31 the bearings 121 are located against a shoulder in said rear end and a hollow pressed metal cup 122 is positioned against the bearing 121, its open end being held in position by the gear member 55 when secured in position on the shaft 31. In this case it will be observed that fastening means 49' for the outer bearing race extends to a position outside the housing. Also that I have formed as one integral intermediate wall designated as 65' the parts comprising the walls 65 and 43 in the previously illustrated form.

Instead of connecting two parts of the overgear idler in the way shown in Figure 1 I provide interlocking teeth at the adjacent ends of these overgear idler members 91' and 93'. The two parts may then be assembled on the sleeve 97' against a shoulder 99'. The other end of the supporting sleeve may then be turned up against the radial flange 105 as clearly illustrated. A cap screw 111' extends from outside the housing through the ring member 87 and into a groove in an outer bearing race 88. A transverse fastening bolt 90 locks the bearing race 88 to the ring 87. The operation of the mechanism disclosed in this second form is substantially the same as that of the first form and does not require further description.

The eccentric sleeve 87 is held axially and from rotation by the set screw 111' in the main casing. The eccentricity of this sleeve is such that the theoretical meshing of the gears 105 and 117 is correct, but in order to cover manufacturing inaccuracies an adjustment for this mesh is provided.

This is accomplished by making the bore of roller race 88 slightly eccentric from its outside diameter. The parts are so assembled that the bore of this roller race is thrown off center laterally by the amount of the eccentricity, and in this way by rotating the roller race 88 in the sleeve 87 the idler assembly consisting of the gears and bearings is raised or lowered substantially vertically. The rotation of the roller race 88 is obtained by means of the transverse screw 90, the thread of which engages with a thread hobbed around the roller race 88. In this way rotation of the screw 90 causes rotation of the roller race 88, after the manner of a worm and worm wheel. It will be understood that the screw 90 passes through a plain clearance hole in the sleeve 87 and a similar plain hole in the main casing. It is provided with a nut and lock washer which serves not only to lock the adjustment but also by cramping the main casing to take up any shake between the various members.

I claim:

1. In change speed transmission, three aligned shafts, means to drive the intermediate shaft from a first end shaft at a plurality of speed ratios, means to drive the second end shaft from the intermediate shaft at the same speed or at a predetermined ratio, means associated with said intermediate shaft and said second end shaft to affect said last named speed changes by an axial movement of said intermediate shaft.

2. The invention defined by claim 1, said intermediate shaft having a reduced end slidable within the open end of the first end shaft, and also having an open end slidable on the reduced end of second end shaft.

3. The invention set forth in claim 1, said intermediate shaft having a reduced end slidable within the open end of the first end shaft and also having an open end slidable on the reduced end of the second end shaft, anti-friction members carried by both ends of said intermediate shaft.

4. In a transmission mechanism, a driving shaft, an aligned shaft, means slidable on said aligned shaft to clutch said driving shaft and aligned shaft together, a driven shaft, means to connect said aligned shaft and said driven shaft whereby the former normally drives the latter in direct, a gear element on said aligned shaft, means to slide the aligned shaft through its slidable clutch member, other driving means constantly associated with the driven shaft and engaged with the gear element of the aligned shaft when the latter is moved from its normal position to a predetermined position whereby the driven shaft is driven from the driving shaft at a predetermined ratio.

5. The invention defined in claim 4, said last mentioned ratio being obtained by a rearward movement of said aligned shaft.

6. The invention defined by claim 4, said last mentioned driving means comprising an overgear idler mounted eccentrically around the driven shaft.

7. A gear ring for interposition between a driving member and a driven member, said gear ring comprising a supporting ring and aligned sleeve members interlocked on said supporting ring at their adjacent ends, said sleeves terminating in gear teeth, means associated with said supporting ring to retain said gear sleeve members in position.

8. In a transmission, a longitudinally movable shaft, a member having clutch teeth mounted for non-rotatable sliding movement thereon, means engaged by said member when moved in one direction to drive in normal high speed, means engaged by said shaft when moved through said member in the opposite direction to drive an overgear.

9. In a transmission device, a driving shaft, an aligned spline shaft, means including a countershaft to drive said spline shaft at a plurality of speed ratios and in reverse, a driven shaft, said spline shaft being longitudinally movable, means associated with said driven shaft and spline shaft whereby the latter drives the driven shaft at the same rate of speed when in one position and in overgear when in a second position of adjustment.

10. The invention defined by claim 9, said last named means comprising an overgear idler mounted eccentrically around said driven shaft.

11. The invention defined by claim 9, said last named means comprising an overgear idler mounted eccentrically around said driven shaft and in constantly operative step-up geared relation with said driven shaft.

12. The invention defined by claim 9, said last named means comprising an overgear idler mounted eccentrically around said driven shaft, there being two step-up gear ratios between said spline shaft and driven shaft, said ratios effected by gear trains, each train including a gear on the overgear idler.

In testimony whereof I affix my signature.

HAROLD DREW.